Aug. 5, 1969 P. DIEFFENBACH 3,459,243
FULLY AUTOMATIC CROSSLIMB ATTACHING MACHINE
Filed July 11, 1966 2 Sheets-Sheet 1

INVENTOR.
PERCY DIEFFENBACH
BY
Sughrue, Rothwell, Mion, Zinn & Macpeak
ATTORNEYS Aug. 5, 1969 P. DIEFFENBACH 3,459,243
FULLY AUTOMATIC CROSSLIMB ATTACHING MACHINE
Filed July 11, 1966 2 Sheets-Sheet 2
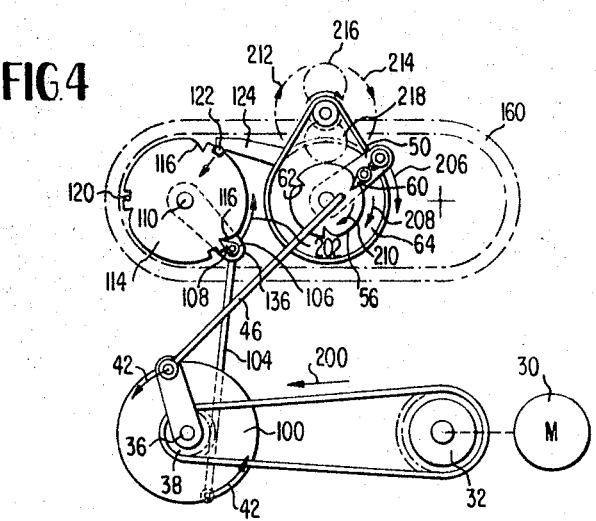
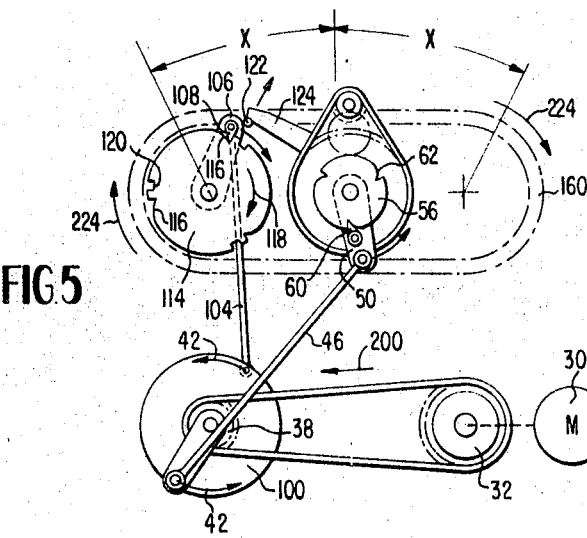
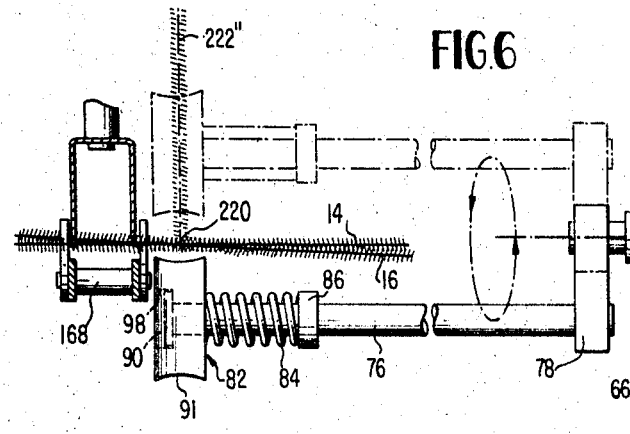
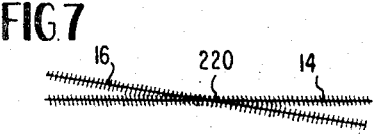
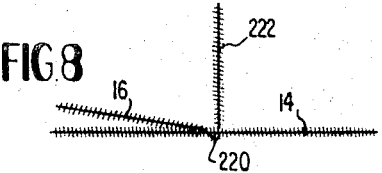
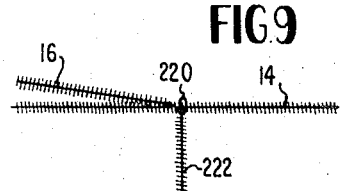
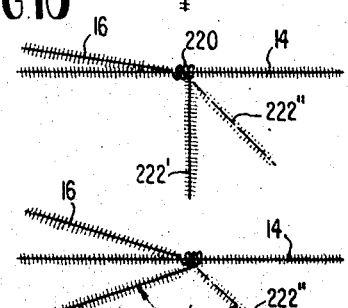
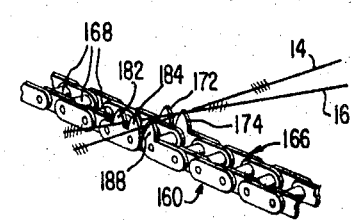
INVENTOR.
PERCY DIEFFENBACH
BY
Sughrue, Rothwell,
Mion, Zinn, & Macpeak
ATTORNEYS

United States Patent Office 3,459,243
Patented Aug. 5, 1969

3,459,243
FULLY AUTOMATIC CROSSLIMB ATTACHING MACHINE
Percy Dieffenbach, R.D. 1, Olyphant, Pa. 18447
Filed July 11, 1966, Ser. No. 564,263
Int. Cl. B21f 7/00, 15/02
U.S. Cl. 140—149                    10 Claims

ABSTRACT OF THE DISCLOSURE

Automated apparatus for coupling an artificial Christmas tree crosslimb to a main tree limb section by wrapping including, initially placing the crosslimb in angular overlapping relationship to the main limb at the feed station of the intermittently moved conveyor, with wrapping occurring at a wrapping station displaced therefrom, during cessation of conveyor movement.

---

The present invention relates to apparatus for attaching an articficial Christmas tree crosslimb to a main limb section and more particularly, to a fully automated arrangement for achieving the same.

Within recent years, there has come into vogue an artificial Christmas tree design known in the industry as "the Scotch pine" type of tree. The tree comprises a tapered series of Christmas tree limbs formed from "brushstock" material. Each of the limbs consists of an elongated main limb section and a crosslimb coupled thereto intermediate of its length with the crosslimb tips directed outwardly at some angle to the longitudinal axis of the main limb, thereby forming a tree limb having three tips. The "brush stock" material comprises a pair of twisted wires which capture precut filaments of polyvinyl chloride or the like to simulate the needles of a real coniferous tree. The "brush stock" may be readily formed by the machine of the type shown in my U.S. Patent No. 3,223,454 entitled, "Apparatus for Making Brushes," issuing Dec. 14, 1965. The so-called "brush stock" formed by the machine is thereatfer used in the production of artificial Christmas trees of the Scotch pine type in a manner set forth in my U.S. Patent 3,278,364 entitled, "Artificial Tree and Method of Making the Same," patented Oct. 11, 1966, and U.S. Design Patent No. 204,887, patented May 24, 1966.

One of the main attributes of this Christmas tree design is the fact that the tree, rather than being sparse like most of the prior Christmas tree designs, is bushy in appearance. This is achieved by having each of the main limb sections, which extend radially from the trunk, carry one or more crosslimbs to provide multiple tips for each limb assembly. In the past, some artificial Christmas tree designs have incorporated crosslimbs by attaching them to the main limb section by stapling, or by using separate wrapping material to wrap the area of juncture between the main limb and the crosslimb sections.

The artificial Christmas tree of the above-identified design patent and the pending utility application involves joining of one or more of the crosslimbs to the main limb section by wrapping the crosslimb section about the main limb axis with two or more turns and then directing the terminal ends of the crosslimb section outwardly toward the tip end of the main limb section to provide a three tip limb assembly. The assembly of the crosslimb section to the main limb section has been achieved in the past by manual labor involving the grasping of the crosslimb by the operator and simply wrapping it several times around the main limb section at the desired point and thereafter directing the terminal ends of the crosslimb section toward the tip end of the main limb section but at some angle thereto, preferably in the order of 30°. The production of such limb assemblies has been achieved only at great cost, due to the requirement for the manual attachment of the crosslimb. In addition to this, the resulting product had, in many cases, failed to achieve the uniformity of configuration which is desired.

It is, therefore, a primary object of this invention to provide a fully automatic apparatus for automatically wrapping a crosslimb about a main limb section to achieve a multiple tip artificial Christmas tree assembly.

It is a further object of this invention to provide a fully automatic crosslimb attaching machine which greatly reduces the cost of producing the limb assembly, while achieving maximum product uniformity.

It is a further object of this invention to provide an improved, fully automatic crosslimb attaching machine in which the rate of production of the multiple tip limb assembly is dependent wholly upon the speed at which the main limb and crosslimb sections are fed into the machine prior to wrapping.

It is a further object of this invention to provide a fully automatic crosslimb attaching machine in which the crosslimb to be wrapped and the main limb section are moved away from the operator, after being fed into the machine, prior to wrapping to reduce any possibility of injury to the machine operator.

It is a further object of this invention to provide an improved, fully automatic crosslimb attaching machine in which the crosslimb section for one limb assembly is wrapped while the limb sections of a succeeding assembly are being fed into the machine at a point spaced from the crosslimb attaching station.

Further objects of this invention will be pointed out in the following detailed description and claims and illustrated in the accompanying drawings which disclose, by way of example, the principle of this invention and the best mode which has been contemplated of applying that principle.

In the drawings:

FIGURE 4 is a modified schematic view of the drive mechanism for the conveyer means and the automatic wrapping means with the conveyer stopped and the wrapping means in the act of wrapping the crosslimb about the main limb section.

FIGURE 5 is a modified schematic view of a portion of the apparatus of the present invention with the conveyer means moving and the wrapping means stopped.

FIGURE 6 is a front elevational view of the wrapper portion of the apparatus shown in FIGURE 1 with the wrapping means in the act of wrapping the crosslimb about the main limb section.

FIGURE 7 is a plan view of the overlapped main limb section and the crosslimb section of the limb assembly supported on the conveyer at the feed station.

FIGURE 8 is a plan view of the limb sections at the wrapping station during the initial act of wrapping the crosslimb about the main limb section.

FIGURE 9 is a plan view of the limb sections after the wrapping means has completed one revolution.

FIGURE 10 is a plan view of the limb assembly after completion of the wrapping operation at the wrapping station.

FIGURE 11 is a plan view of the completed limb assembly with the crosslimb tips directed forwardly in the direction of the main limb tip at some angle thereto.

FIGURE 12 is a perspective view of a portion of the conveyer chain supporting overlapped main limb and crosslimb sections for transportation from the feed station to the wrapping station.

In general, the apparatus of the present invention comprises means for supporting a crosslimb in overlapping relation to a main limb section, means for moving the overlapped crosslimb and main limb sections from a feed station to a wrapping station spaced therefrom and means for wrapping one of said limb sections about the other limb section intermediate of the section ends to securely unite the sections and to thereby form a completed limb assembly. In a preferred embodiment, an endless conveyer chain supports the oriented crosslimb and main limb sections and moves the same from a feed station to a wrapping station while the wrapping means is stopped. The conveyer is then stopped and the wrapping means wraps the crosslimb three turns about the main limb axis to form a completed limb assembly. Common drive means operate a pair of pawl and ratchet mechanisms 180° out of phase to achieve intermittent movement of the conveyer chain and operation of the wrapping means in the aforesaid manner.

Figure 3:
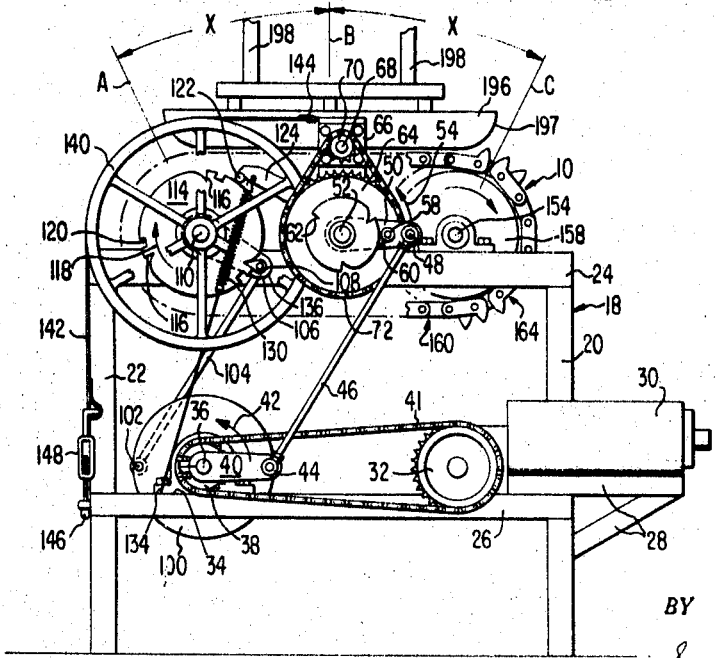
FIGURE 3 is a full side elevational view of the apparatus of the present invention on the side opposite that of FIGURE 1.

Referring to the drawings, there is shown in FIGURE 3 the fully automated crosslimb attaching apparatus of the present invention which incorporates, in general, three stations, a feed station A at the forward end of the machine, a wrapping station B centrally of the apparatus and a discharge station at the left-hand side of the machine. The machine, in general, constitutes two main elements, conveyer means generally indicated at 10, and wrapping means indicated generally at 12, seen best in FIGURE 6. The apparatus of the present invention operates upon the principle that the conveyer means 10 is moving when the wrapping means 12 is stopped and vice versa. Thus, in sequence, a main limb 14 and a crosslimb 16 are fed into the machine at feed station A while the wrapping means 12 is wrapping a crosslimb 16 about a main limb section of a preceding limb assembly at wrapping station B. Meanwhile, a second operator or second automatic conveying means (not shown) is removing a completed limb assembly from the conveying means at the discharge station C. Thereafter, by automatic drive means, the conveyer 10 is stepped a distance X, while the wrapping means 12 is stopped, to index newly associated main and crosslimb sections 14 and 16 into position to be wrapped while moving the now completed or wrapped crosslimb assembly to the discharge station C for manual or automatic discharge.

The unitary apparatus comprises a rectangular frame assembly 18 including spaced, vertical frame sections 20 and 22 and upper horizontal frame section 24 and a lower horizontal frame section 26. The frame members 20 through 26 may be readily formed from steel angle bar stock, the frame members being welded together to provide a unitary frame assembly. While not shown, it is obvious that each of the side frame sections 18 are joined by suitable transverse members to provide an open frame table acting to support the operative elements of the machine. In this respect, the lower horizontal member 26 cooperates with suitable support members 28 to support a unitary gear motor 30 which provides a desired rotary drive output to main drive sprocket 32. Displaced to the rear of sprocket 32, along the same horizontal support bar 26, is a fixed shaft support member 34 which receives the horizontally extending shaft 36. Shaft 36 is freely rotatable by use of appropriate sleeve bearing means. The shaft 36 has coupled thereto a second sprocket member 38. A suitable drive chain 40 couples the output of the gear motor 30 to shaft 36 through sprocket members 32 and 38, respectively. Sprocket member 32 is of larger diameter than sprocket member 38 to rotate sprocket 38 and associated shaft 36 at a desired r.p.m., such as 24 r.p.m., depending upon the setting of gear motor 30.

Fixed to the outer end of the shaft 36 is a radially extending arm or eccentric 40 which rotates in unison with the shaft, continuously in a counterclockwise direction as indicated by arrow 42. At the outer end of eccentric 40 there is provided a pivotable connection 44 for coupling eccentric rod 46. The upper end of the eccentric rod 46 is pivotably connected at 48 to a rocker arm 50. The rocker arm 50 is oscillated about a pivot point provided by shaft 52. Shaft 52 is mounted upon the upper horizontal bar 24 by suitable support means (not shown) including appropriate sleeve bearings. Therefore, in conventional fashion, with the rocker arm 50 mounted for free rotation about shaft 52, clockwise rotation of the eccentric 40 about its axis causes oscillation of the rocker arm 50. The degree of oscillation is controlled by the radial distance from the pivot axis of shaft 36 to the eccentric rod connection 44. With reference to FIGURE 3, when eccentric 40 is moving from a full bottom position to a full top position, the rocker arm 50 is moving upwardly in the direction shown by arrow 54.

While the rocker arm 50 is freely carried by shaft 52, ratchet wheel 56 is fixed to shaft 52 and positioned adjacent and spaced slightly from one side of rocker arm 50. Rocker arm 50 further carries a spring-biased pawl member 58 including a radial finger or tip 60 which is shown spring-biased into abutting contact with the periphery of ratchet wheel 56. The ratchet wheel 56 is provided in this case with three notches or recesses 62 which act to receive the tip 60 of the pawl as pawl 58 moves upwardly in a counterclockwise direction, as indicated by arrow 54. Obviously, during counterclockwise rotation of the rocker arm 50, pawl member 58 merely slides over the peripheral surface of the ratchet wheel without engaging its radial extension or tip 60 with the ratchet wheel notches 62. However, at the end of its counterclockwise movement, upon reversing the spring-biased pawl, tip 60 falls into one of the notches 62 to thereby cause a partial rotation of the ratchet wheel 56 in a clockwise direction.

The ratchet wheel 56 is provided with three notches 62 spaced 120° apart. For each full revolution of the eccentric 40, there is provided a one-third revolution for ratchet wheel 56 and the rigidly coupled shaft 52. The radial position of pawl 58, the diameter of wheel 56 and the radial position of eccentric connection 44 controls the movement of rotation. Displaced rearwardly of both ratchet wheel 56 and rocker arm 50 is sprocket member 64. The sprocket member 64 is rigidly coupled to shaft 52 and rotates therewith. Thus, sprocket member 64 rotates a one-third revolution during each oscillation of rocker arm 50. Support member 66 rises vertically from the horizontal frame member 24 and acts to support, for free rotation, shaft member 68 which is vertically in line with shaft 52. A small sprocket member 70 is rigidly coupled to the shaft 68. Endless chain 72 mechanically couples sprocket 64 and sprocket 70 with the diameter of the sprockets and a number of teeth carried thereon providing for three revolutions of rotation for shaft 68 for each one third-revolution of the larger sprocket member 64. Shaft 68 rotates three full revolutions intermittently, the rotation occurring during the period of time at which the pawl tip 60 engages the ratchet wheel notch 62 during the downward or return stroke of eccentric rod 46.

Figure 2:
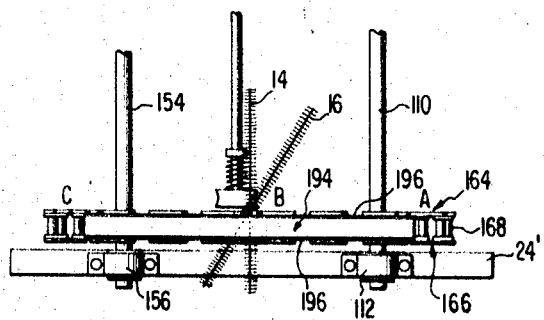
FIGURE 2 is a plan view of the portion of the apparatus shown in FIGURE 1.

As mentioned previously, the effect of the intermittent, three revolution rotation of shaft 68 may be best seen by reference to FIGURES 6 and 2. Shaft 68 is supported by bearing means 74 at the upper end of the vertical support member 66 and is driven by chain member 72. One end of an eccentric arm 78 is rigidly coupled to the end of shaft 68 opposite that of sprocket 70, while the outer end of the eccentric arm is fixedly coupled to the shaft 76. Shaft 76 extends away from and is parallel to the axis of the short shaft 68. As indicated by the dotted line circular arrow path 80, the shaft 76 is given a three revolution eccentric rotation about the axis of shaft 68 in response to an intermittent one-third revolution rotation of the larger sprocket 64 carried by shaft 52.

In order to achieve a multiple wrap of the center of crosslimb 16 about the main limb section 14, there is provided at the free end of shaft 76 an annular disk 82 which is slidably received upon the outer end of shaft 76 and is resiliently biased in an extreme left-hand position as indicated in FIGURE 6 by a compression spring 84. An annular stop member 86 is fixed to rod 76 with the inner end of the spring 84 abutting against the face on the annular stop member. The disk 82 is provided with a recess 88 and the end of the shaft 76 termintaes with a radial extension portion 90 which acts as an abutment for the disk 82 preventing further axial movement of the disk from right to left in response to the bias of compression spring 84. The spring 84, therefore, allows the wrapping disk 82 to slide on eccentrically mounted shaft 76 but tends to bias the disk into the extreme outward position shown in FIGURE 6. The periphery 91 of disk 82 is concave for wrapping purposes. The eccentric shaft 76 and disk 82 carried thereby rotate about the axis of shaft 68, causing the crosslimb 16 to wrap itself about the main limb section 14 a number of times to securely lock the crosslimb on the main limb section. The number of wraps is dependent upon the relationship between the number of teeth carried by the small sprocket 70, as contrasted to the number of teeth carried by the larger sprocket 64. The number of teeth and the diameter of the sprockets are so selected that for each one-third revolution of larger sprocket 64, there are three revolutions for the smaller sprocket 70 and therefore, the disk 82 carried by the eccentric shaft 76.

Figure 1:
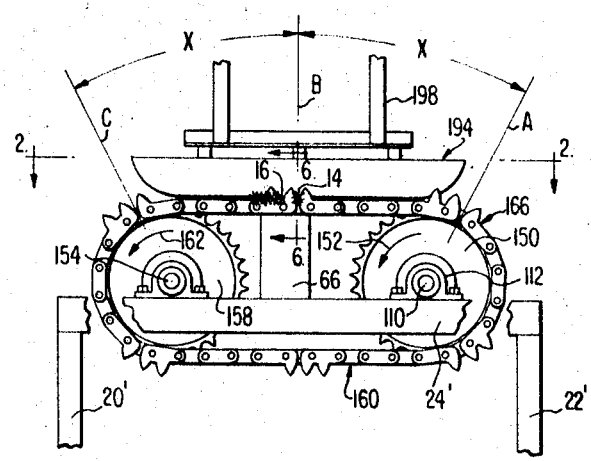
FIGURE 1 is a side elevational view of a portion of the apparatus of the present invention showing the means for conveying the associated main limb and crosslimb sections from the limb feed station to the wrap station and thence to a limb assembly discharge station.

The second primary portion of the present invention is the conveyer means for sequentially moving the pre-oriented crosslimb and main limb sections from the feed station A to the wrapping station B and then to the discharge station C with the conveyer being moved during the time when the eccentric wrapping mechanism is stopped and vice versa. Referring again to FIGURE 3, it is noted that the same shaft 36 carrying the eccentric 40 is also fixedly coupled to a large disk member 100 which rotates in unison with the eccentric or arm 40. The disk 100 acts in the same manner as eccentric 40 in that it pivotally supports at 102 a second eccentric rod 104 but at a position 180° out of phase with respect to the eccentric 40. Thus, as the eccentric rod 46 is moving upwardly, under the conditions shown in FIGURE 3, eccentric rod 104 is moving downwardly. The eccentric rod 104 is coupled to an associated rocker arm 106 through a pin connection which also supports a pawl member 108. The inner end or rocker arm 106 is supported on a transversely extending shaft 110 for free rotation thereabout, the shaft 110 being supported by spaced sleeve bearing members 112 coupled directly to the horizontal frame member 24′, for instance (FIGURE 1). Positioned adjacent to the rocker arm 106, on shaft 110 and rigidly coupled thereto, is ratchet wheel 114 which is also provided with three V-notches 116 equally spaced about the wheel periphery, 120° apart in like manner to the ratchet wheel notches 62 of wheel 56. Thus, as the eccentric rod 104 moves upwardly, the pawl member 108 which is spring-biased against the periphery of wheel 114 slides on the peripheral surface. However, during the return stroke of eccentric rod 104, the pawl member 108 engages one of the slots 116 and causes the ratchet wheel 114 to rotate one third of a revolution in like manner to the rotation of ratchet wheel 56. As the eccentric rod 104 moves downwardly, as indicated in FIGURE 3, and ratchet wheel 114 rotates clockwise one third of a revolution as indicated by arrow 118, one of the three rectangular notches 120 moves into a radial in-line position with a pin extension member 122 carried at the radial extremity of arm 124. The arm 124 is pivotably supported by the frame member and may, for instance, be pivotably monuted at its inner end on the transversely extending shaft 52 or may be readily coupled to the vertical support member 66 by a suitable, pivotable connection allowing free oscillation about the pivot axis. The pin member 122 is spring-biased into contact with the periphery of ratchet wheel 114 by means of a tension spring 130. One end of the spring member is coupled to arm 124 and the other end is conveniently fixed to one of the frame members, such as horizontal member 26. The position of the rectangular notches 120 is so related to the V-shaped notches 116 that as the eccentric rod 104 reaches its lowermost position when the pivot poin 102 is at bottom dead center with respect to disk 100, the spring-biased pin extension 122 falls into the rectangular notch 120, thereby preventing further rotation of the ratchet wheel 118 in any direction until arm 124 is mechanically moved clockwise about its pivot point to release the wheel. This is automatically achieved by the movement of rocker arm 106 during its counterclockwise rotation from the lowermost position to its uppermost position. Rocker arm 106 is positioned on shaft 110 so as to be in the same plane as the spring-biased pivotable arm 124, whereby the rounded edge 136 provided at the outer end of rocker arm 106 moves into abutting position with the bottom surface of pivotable arm 126 to thereby jar the pin 122 from its rectangular recess or notch 120 as the pawl member slides counterclockwise on the peripheral surface of ratchet wheel 114. The surface 136 of the rocker arm thereby acts to prevent re-engagement of the pin 126 with the peripheral surface of ratchet wheel 114 until after pawl member 108 engages the adjacent V-shaped recess 116. Due to engagement of pawl 108 and ratchet recess 116, the continuously moving disk 100 and the eccentric rod move the pawl and ratchet connection clockwise past the now radially spaced arm engaging pin 126. Thereafter, the pin 126 falls onto the peripheral surface of ratchet wheel 114, beyond the V-notch 116 and rides upon this surface until it encounters the next succeeding rectangular cutout 120, whereupon it moves into the recess to prevent retrograde movement of the ratchet wheel 114.

The conveyer mechanism must be stopped at the time that the wrapping mechanism wraps the center portion of the crosslimb three times about the main limb axis. In addition to the use of the positive stop pin 126 and the spaced, rectangular recesses 120, there is further provided on shaft 110 a relatively large, spoked pulley 140 which is physically coupled to shaft 110 and rotates therewith. The peripheral surface of the pulley 140 is provided, for instance, with a V-groove which receives an appropriate V-belt 142, the V-belt extending approximately over an area of 90°. The upper end of the V-belt 142 is fixed to vertical support member 66 as at 144 and the lower end of the V-belt is coupled at 146 to the frame member by means of a variable tension coupler 148. The V-belt 142 does not rotate with the wheel 140 but acts as a tension brake resisting rotation of the wheel 140 and shaft 110 and all of the elements carried thereon. While pin extension 126 acts as a positive stop for the shaft 110, the V-belt acts merely as a continuously applied brake during rotation of the wheel, upon release of the positive stop means 126.

As indicated in FIGURES 1 and 2, shaft 110 extends transversely across the machine and is supported for free rotation about the shaft axis by bushing member 112. A first sprocket wheel 150 is fixedly coupled to the shaft adjacent bushing 112 and is rotated intermittently in a counterclockwise direction, as indicated by arrow 152 in FIGURE 1. Since ratchet wheel 114 rotates one third of a revolution during each full oscillation stroke of eccentric rod 104, sprocket wheel 150 moves 120° or one third of a revolution and then stops for a short period of time. Horizontally spaced from shaft 110 is a second transversely extending shaft 154 carried by similar bearing support means 156, the shaft 154 being mounted for free rotation about the shaft axis. Shaft 154 carries a second sprocket member 158 of equal diameter and carrying an equal number of teeth as sprocket 150. A specially formed endless conveyer chain 160 is carried by the spaced sprocket wheels 150 and 158, whereupon the second sprocket wheel 158 is intermittently driven in the same direction as sprocket wheel 150, as indicated by arrow 162. The conveyer chain 160 serves the dual purpose of conveying the main limb and crosslimb sections from the feed station A to the wrapping station B and thence to the discharge station C while maintaining the desired positioning of the crosslimb with respect to the main limb and in overlapping and angled relationship so that the eccentric wrapping member or disk 82 may effectively provide the three turn wrap necessary for a secure attachment. The chain member 160, as best seen by reference to FIGURES 2 and 12, incorporates chain sides 164 and 166 separated by conventional pin connections 168 so that each of the link members are pivotally coupled to each other while the cross-pins 168 engage the sprocket teeth to provide positive drive movement to the conveyer chain itself. The position of the chain elements in FIGURE 12 corresponds to the position shown in FIGURE 3 looking inwardly toward the plane of the paper. This showing is opposite in orientation to that of FIGURES 1 and 2. On chain side 166, link member 170 is provided with a raised, tapered end tip or tooth 172 which cooperates with raised tooth 174 carried at the left-hand end of abutting chain link 176. Both the crosslimb 116 and the main limb section 114 are received within gap 178 between the teeth 172 and 174 for this side of the conveyer chain. With reference to the opposite side of the conveyer chain 164, it is noted that left-hand link 180 includes an intermediate tooth 182 and a right-hand tooth 184 forming a V-shaped gap 186 therebetween while the abutting link 188 to the left of this link includes at its left-hand end a single tooth projection 190 to form a V-shaped gap 192 directly in line with the gap 178 on the opposite side of the chain. The operator merely has to select one of the crosslimb sections 16 and a main limb section 14 and place them in position straddling the conveyer chain and located in the particular gaps 178, 186 and 192 in the manner shown in FIGURE 12. In this respect, the main limb section 14 is in line with the connecting pins 168 between the chain sides 164 and 166 and stretches across the chain falling within gap 178 and in-line gap 192. The crosslimb section 16, on the other hand, has its inner end that is closest to the point of wrap falling within gap 178 between teeth projections 172 and 174, while the outer ends of the same crosslimb 16 fall within gap 186 formed by the projecting teeth 182 and 184 carried by the single chain link 180. The main limb and crosslimb sections 14 and 16, respectively, are so positioned on the chain at the feed station A, with the placement taking place while the chain belt conveyer is stationary and eccentric rod 104 is moving from its lowermost position to its uppermost position. The dimensions of the various moving elements of the machine are so selected that the chain conveyer moves a distance X, as indicated in FIGURE 3, to position in sequence the crosslimb from the feed station A to a position centrally of the machine at the wrapping station B and thence to the opposite side of the machine at discharge station C. In order to hold the crosslimb sections 14 and 16 in place within their respective groove of the conveyer teeth, there is provided a rigid, stationary guide member 190. Guide member 190 includes a pair of spaced plates 196 having curved leading and trailing edges 197 which extend downwardly between the rows of chain links 164 and 166, adjacent the inner surfaces of the link member and spaced slightly above the connecting pins 168. Plates 196 press down upon the transversely extending limb sections to prevent both lateral and vertical movement of the limb sections during transport, especially at the wrapping station B when the conveyer is stationary and the wrapping disk 82 rotates eccentrically about the shaft axis 68 to wrap the crosslimb three times about the axis of the main limb section. Suitable support members 198 are connected to means (not shown) to securely locate and position the guide member 190 with respect to the endless conveyer chain.

The out of phase action between the two main subassemblies of the machine, that is, the conveyer means 10 and the wrapping means 12 may be best appreciated by reference to schematic FIGURES 4 and 5. Gear motor 30 continuously rotates sprocket wheel 32 in a clockwise direction, as indicated by the arrow 200 above the sprocket chain 40. This causes continuous counterclockwise rotation of driven sprocket 38, shaft 36, eccentric 40 and disk 100 as shown by arrows 42. In FIGURE 4, with disk 100 rotating counterclockwise, eccentric rod 104 moves from a bottom dead-center position upwardly causing rocker arm 106 to oscillate counterclockwise as indicated by arrow 202 moving pawl tip 108 out of its receiving notch 116 while associated ratchet wheel 114 is positively blocked against rotation by the pin extension 122 carried by spring-biased arm 124 being securely located within rectangular notch 120. Arrow 204 represents the line of action of the biasing spring. As rocket arm 106 moves counterclockwise, the pawl tip 108 moves from its engaging position within ratchet notch 116 and slides along the smooth peripheral surface of ratchet wheel 140 until the rounded edge 136 of the rocker arm abuts spring-biased arm 124 thereby moving the positive stop pin 122 out of engagement with notch 120. While the schematic showing of FIGURE 4 does not show the effect of the V-belt brake member 142, the presence of the tension V-belt prevents any slack movement of the elements mounted on shaft 110 and even though the positive stop 122 is disengaged at this point, there is no retrograde movement due to the presence of belt 142 and belt pulley 140. The conveyor chain 160, represented by the parallel dotted lines, therefore, is held stationary, allowing a pair of limb elements 14 and 16 to be positioned within the appropriate conveyer teeth notches at the feed station A while a wrapped three tip limb assembly is being removed at discharge station C.

Meanwhile, eccentric 40 is moving counterclockwise from its dead-center position causing eccentric rod 46 to move downwardly carrying with it rocker arm 50. The clockwise rotation of rocker arm 50 causes engagement between pawl tooth extension 60 and notch 62 of ratchet wheel 56. Therefore, as indicated by arrows 206, 208 and 210, rocker arm 50 oscillates clockwise and ratchet wheel 56 is driven clockwise, as well as large sprocket 64. The degree of oscillation for members 50 and 60 is the same, that is, 120°, prior to the eccentric 40 reaching a dead bottom position. The small pinion 70 rotates three revolutions during the one-third revolution of the larger sprocket 64, as indicated by arrows 212 and 214. The eccentric disk 82, which, incidentally, does not rotate about its own axis, is driven eccentrically about the shaft axis 68 three full revolutions to wrap the crosslimb 16 three times about the main limb section 14 at the point of engagement. The position of the eccentric disk 82 at its top dead-center and bottom dead-center position is shown by the dotted circles 216 and 218, respectively, in FIGURE 4.

The method in which wrapping occurs through the sequence of events just now described may be further appreciated by reference to FIGURES 7 to 11 inclusive. The plan view of FIGURE 7 shows the two limbs 14 and 16 as being overlapped in the position they are received by the notched links of the carrier chain at the feed station A. The limb sections remain in this position as they move from the feed station A to the center of the machine constituting the wrapping station B. At wrapping station B, the initial eccentric rotation of the eccentric disk 82 about the shaft axis 68 causes the eccentric to engage the crosslimb 16 inside of the crossover point 220 which results in the forcing of the inner end 222 of crosslimb 16 to twist itself about the main limb section which is generally in line with the axis of shaft 68 so that as a result of 180° of rotation, the end 222 of the crosslimb is in the position shown in FIGURE 8. The plan view of only the limb section of FIGURE 8 corresponds exactly to the dotted line portion 222′ of limb 16 as shown in FIGURE 6. Incidentally, the dotted line position of the eccentric disk 82 and its mounting shaft 76 of the same figure is a position occupied by these elements after a one-half rotation of the element about shaft 68 and after a one-sixth wrap of the crosslimb about the main limb section. FIGURE 9 shows the position of the limb sections after 360° wrap or one full turn.

Reference to FIGURE 10 indicates the location of the inner end 222 of the crosslimb subsequent to a three turn wrap at wrap point 220. The inner crosslimb section 222 may extend, therefore, at right angles to the axis of the main limb section 14 or may be actually directed inwardly somewhat in line with the main limb section, as indicated by the dotted line position 222″. Therefore, it is necessary to rotate the limb section 222 to the position shown in FIGURE 11 from the dotted line position 222″ in order to produce the three tip limb assembly which has received such public acceptance on the tree design provided by applicant. This rotation about the angle indicated as α may be achieved either automatically by guide means associated with the endless conveyer belt or manually after the discharge of the limb assembly at the discharge station C.

In moving the conveyer belt the distance X to sequentially and intermittently present the tree limb sections 14 and 16 from the feed station A to the wrapping station B and thence to the discharge station C, each time indexing occurs during the time when the eccentric disk 82 is at rest and in the bottom dead-center position of FIGURE 5. Referring to FIGURE 5, gear motor 30 is continuously driving the large sprocket 32 with the chain 40 moving counterclockwise, as indicated by arrow 200, to continuously rotate small sprocket 38, shaft 36 and the rigidly coupled eccentric 40 and disk 100. As the eccentric 40 reaches dead bottom position, and eccentric rod 46 starts to move upwards, rocker arm 50 now moves in a counterclockwise direction and pawl tip 60 disengages itself from the triangular recess or notch 62 and slides on the smooth outer peripheral surface of the ratchet wheel 56. Therefore, the wrapping mechanism is idle during the complete upward stroke of the eccentric rod 46.

On the other hand, with the disk 100 tending to rotate counterclockwise, as indicated by arrows 42, eccentric rod 104, upon reaching top dead-center position, changes the direction of oscillation of rocker arm 106 from a counterclockwise to a clockwise direction. Pawl 108 falls into the V-shaped notch 116 after riding over the adjacent rectangular notch 120. The pawl 108, in catching the notch, causes the ratchet wheel 114 to rotate along with the rocker arm 106 in a clockwise direction, as indicated jointly by arrows 118. The rounded surface 136 meanwhile is acting as a cam tending to maintain spring-biased brake lever arm 124 away from the ratchet wheel 114 and preventing the pin extension 122 from falling into a rectangular recess 120. The pin 122 will actually move around to the other side of the rounded tip 136 of rocker arm 106 and after some degree of rotation of ratchet wheel 114, the pin will fall on the peripheral surface of the ratchet wheel at a point beyond the V-shaped notch 116 which is presently receiving the pawl tip 110. With drive sprocket 150 rigidly coupled to shaft 110, the conveyor chain 160 will be moved clockwise, as indicated by arrows 224, a distance X which constitutes exactly the extent of movement necessary to move the newly inserted main limb and crosslimb sections from the feed station A to the wrapping station B and the now wrapped limb assembly from the wrapping station B to the discharge station C.

The apparatus continues to operate in intermittent fashion with the conveyer feed mechanism and the wrapping mechanism 180° out of phase. The production rate is determined by how fast associated automatic or manual means may achieve placement of the main limb and crosslimb sections 14 and 16 within respective notches 178, 186 and 192 at feed station A and removal of the completed limb assembly at the discharge station C, since gear motor 30 may readily increase or decrease the r.p.m. of drive sprocket 32.

Various stops (not shown) may be provided as guides for the longitudinal insertion of the cross and main limb sections 16 and 14 so as to achieve the desired tip length for all three tip sections 222, 226 and 228, as well as the point of wrap-around 220 with respect to the overall length of the limb assembly. All machine elements within the instant apparatus may be formed of stock metal or like material, the elements themselves being conventional in the art.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A fully automated crosslimb attaching apparatus for wrapping a crosslimb intermediate of its ends about a main limb section to form a multi-tip artificial Christmas tree limb assembly comprising: means for supporting one limb section in angular overlapping relationship to a second limb section, conveyor means for moving said overlapped limb sections from a feed station to a wrapping station spaced therefrom, and means for wrapping one of said limb sections about said other limb section intermediate of said section ends to thereby securely unite said sections and to form a completed limb assembly.

2. The apparatus as claimed in claim 1 further including means for operating said conveyor means to transport said overlapping limb sections from said feed station to said wrapping section while said wrapping means is stationary and means for operating said wrapping means when said conveyer means is stationary.

3. The apparatus as claimed in claim 1 wherein said conveyer means comprises endless conveyer means, and limb section receiving means coupled to said endless conveying means at longitudinally spaced locations for maintaining said limb sections in overlapped relationship at said wrapping station to facilitate uniform wrapping of one of said limb sections about the other.

4. The apparatus as claimed in claim 1 wherein said conveyer means comprises an endless chain and said apparatus further includes means for incrementally moving said chain a distance equal to the spacing between said feed station and said wrapping station, said endless chain comprising pairs of link members spaced laterally, one of said pairs of link members having means for commonly holding said main limb and crosslimb sections at right angles to the direction of movement of said endless conveyer chain, and said other pair of link members have longitudinally spaced main limb and crosslimb locating means whereby a desired angled overlap between said crosslimb and said main limb section is thereby achieved.

5. The apparatus as claimed in claim 4 further including stationary guide means spaced slightly from said moving conveyer belt links to guide and maintain said angled overlap limb section into a desired position at said wrapping station to facilitate wrapping of one of said limb sections about said other limb section.

6. The apparatus as claimed in claim 1 wherein said means for wrapping one of said limb sections about said other limb section constitutes eccentrically driven means spaced to one side of the point of overlap between said crosslimb and main limb section and means to rotate said eccentric means at least one full turn to thereby achieve wrapping of one of said limb sections about the other limb section.

7. The apparatus as claimed in claim 1 further including common drive means for moving said conveyer means and said wrapping means, and sepaarte pawl and ratchet drive means associated with said wrapping means and said conveying means to intermittently feed the crosslimb and main limb sections to a wrapping station and remove the completed limb assembly therefrom, and to effect wrapping of one limb section about the other when said conveyer means is momentarily halted.

8. The apparatus as claimed in claim 1 further including common drive means for said conveyer and wrapping means including separate pawl and ratchet means and means for connecting said pawl and ratchet means for respective conveyer and wrapping means 180° out of phase with each other such that said conveyer means is moving while said wrapping means is stationary and vice versa.

9. The apparatus as claimed in claim 7 further including means for positively preventing retrograde movement of said conveyer when said conveyer is halted and said wrapping means is operating.

10. The apparatus as claimed in claim 4 wherein said wrapping means constitutes a disk member, and means for mounting said disk member for eccentric movement about the axis of one of said limb sections, spaced to one side of the crossover point between said limb sections, adjacent said endless chain link member having common main limb and crosslimb location means.

References Cited

UNITED STATES PATENTS

| | | | |
|---|---|---|---|
| 2,718,802 | 9/1955 | Cook | 140—1 |
| 2,860,670 | 11/1958 | McCain et al. | 140—149 |
| 2,942,630 | 6/1960 | Schmid | 140—149 |
| 3,084,721 | 4/1963 | Sindy et al. | 140—149 |
| 3,109,277 | 11/1963 | Raymond et al. | |
| 3,244,577 | 4/1966 | Raymond | 161—22 |
| 3,278,364 | 10/1966 | Dieffenbach | 161—22 |
| 3,297,059 | 1/1967 | Trotta | 140—115 |
| 3,380,487 | 4/1968 | Kraszeski et al. | 140—149 |

CHARLES W. LANHAM, Primary Examiner

E. M. COMBS, Assistant Examiner

U.S. Cl. X.R.

140—71, 113